April 10, 1973  H. F. HERRMANN ET AL  3,726,783
APPARATUS FOR PRODUCING AN ALUMINUM FOIL OR BAND WITH AN
ELECTRICALLY INSULATING OR DECORATIVE COATING THEREON
Original Filed Jan. 29, 1969
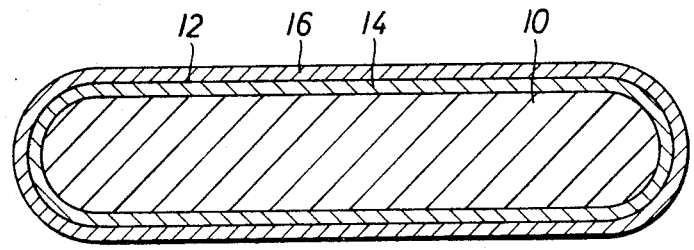
FIG. 1
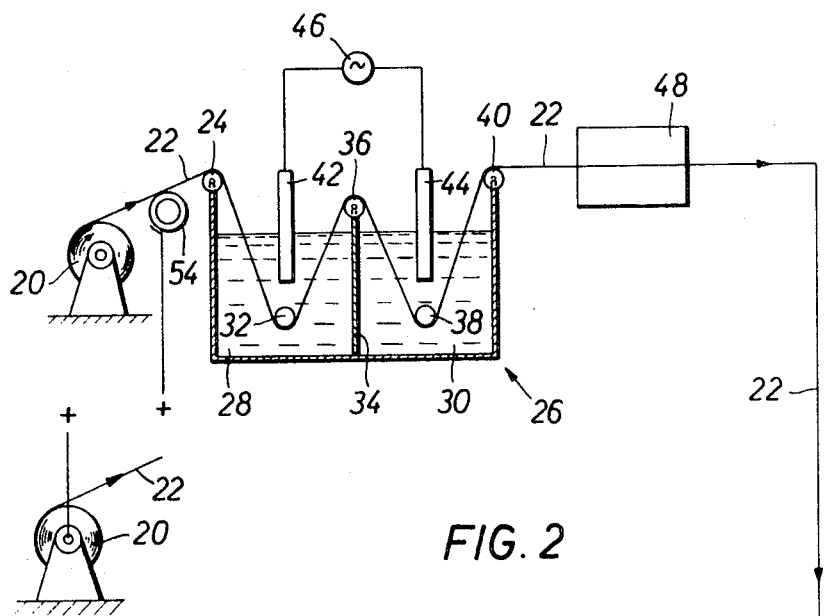
FIG. 2
FIG. 2a
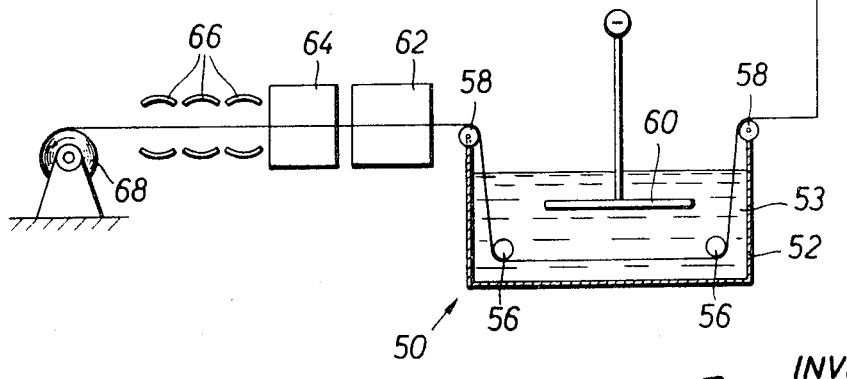
INVENTOR
HELMUT FRIEDRICH HERRMANN
BY ROLANDO M. ORON
Adam J. Stroker
Attorney

United States Patent Office 3,726,783
Patented Apr. 10, 1973

3,726,783
APPARATUS FOR PRODUCING AN ALUMINUM FOIL OR BAND WITH AN ELECTRICALLY INSULATING OR DECORATIVE COATING THEREON
Helmut Friedrich Herrmann, Cologne-Braunsfeld, and Rolando M. Dizon, Cologne, Germany, assignors to Metalloxyd Gesellschaft mit beschrankter Haftung, Cologne-Braunsfeld, Germany
Original application Jan. 29, 1969, Ser. No. 749,911, now Patent No. 3,634,206. Divided and this application Mar. 19, 1971, Ser. No. 126,034
Claims priority, application Germany, Feb. 3, 1968, P 16 46 038.1
Int. Cl. C23b 9/02, 13/00; B01k 5/02
U.S. Cl. 204—300    6 Claims

ABSTRACT OF THE DISCLOSURE

An aluminum foil, band or the like with an electrically insulating or decorative coating applied to the outer surface thereof and comprising an inner oxide layer and an outer lacquer layer. Also disclosed are a method and an apparatus for producing the coated foil or the like in a continuous manner by passing the foil first through an electrolytic anodizing means for producing the oxide layer and subsequently through an electrophoresis device for applying the lacquer layer onto the oxide layer.

CROSS-REFERENCES TO RELATED APPLICATIONS

This application is a division of our copending application Ser. No. 794,911, Aluminum Foil or Band With an Electrically Insulating or Decorative Coating Thereon and a Method for Producing the Same, filed Jan. 29, 1969, now U.S. Pat. 3,634,206.

BACKGROUND OF THE INVENTION

The present invention relates to an aluminum foil, band or the like with an electric insulating or decorative coating thereon, and more particularly to an apparatus for continuously producing the aluminum foil or the like with the coating thereon.

It has been known for a considerable length of time that aluminum foils or bands can be used as electrical conductors for instance in band spools, condensers, and similar devices. For this purpose the foil or band is provided with an electrically insulating coating applied to the outer surface thereof. It is further known that an oxide layer applied to the outer surface of the band or foil forms a good electrical insulator and has in addition other advantageous characteristics. It is also known that such an oxide layer is porous and that the pores of the layer may be filled in various ways with organic or inorganic matter which may include foreign metals, organic pigments or inorganic precipitations. It is also known to provide a layer of lacquer as an electric insulation on wires or the like. Finally, the anodic deposition of organic matter by electrophoresis is also known. Electrophoresis is known for depositing of lacquers of different kind for providing a protective coating as well as for obtaining decorative effects.

However, no apparatus has heretofore been known wherein an oxide layer can be applied to aluminum band or foil, and wherein thereupon a coating can be electrophoretically applied over the oxide layer in the same apparatus and in the same operating step in a continuous manner.

It is an object of the present invention to provide for the manufacture of an aluminum foil or band with an electrically insulating and/or decorative coating having improved insulating and tenacity characteristics as compared with such coatings known in the art.

It is a more specific object of the invention to provide an apparatus for effecting the production of such an aluminum band or foil, in a continuous and efficient manner.

SUMMARY OF THE INVENTION

The present invention is based on the new recognition that an aluminum foil or the like which is, subsequent to an electrolytical oxidation for the production of an oxide layer thereon, provided with a lacquer layer by electrophoresis, has electrical characteristics which surprisingly are better than the sum of the electrical characteristics which would be normally expected by the common application of the two method steps.

The present invention is on the one hand directed to an apparatus for producing an aluminum foil or the like having an electrically insulating and/or decorative coating and comprising an inner electrolytically produced oxide layer and an outer lacquer layer applied by electrophoresis to the inner oxide layer.

In this way, an electrically insulating coating is obtained which combines a surprisingly high insulation coefficient with an excellent mechanical strength and a perfect binding of the coating to the base material. When used as decorative coating, it is characterized by its sturdiness, stability and a perfect aesthetic appearance.

On the other hand, the present invention is also directed to an apparatus for producing such an aluminum foil or the like in which the two layer coating may be produced in a single continuous process.

The apparatus according to the present invention mainly comprises means for continuously passing an elongated metal foil or the like consisting essentially of aluminum or aluminum alloy through an electrolytic means comprising at least two adjacent chambers each containing an electrolyte and each equipped with an electrode connected to an alternating current supply, for thereby producing an oxide layer on the outer surface of the foil so that the latter forms during its passage through the chambers a bipolar conductor. Rinsing means serves for rinsing the oxide layer downstream of the electrolyte means and subsequently the foil with the rinsed oxide layer thereon is passed through an electrophoresis bath wherein an outer lacquer layer is applied to the oxide layer. We may further provide means for rinsing the outer layer downstream of the electrophoresis bath, and means for subsequently drying the outer lacquer layer and burning in the same while continuously moving the foil in longitudinal direction.

With the present invention it is therefore possible to provide an aluminum foil or band in a single continuous process, which may be carried out automatically, with an electrically insulating outer coating comprising an inner oxide layer and a lacquer layer applied by electrophoresis thereto.

Briefly, recapitulated, the novel apparatus may include electrolytic anodizing means, an electrophoresis bath, means for guiding the electrofoil or band through the anodizing means and the electrophoresis bath in a continuous manner, and means for rinsing the foil after leaving the anodizing means as well as after leaving the electrophoresis bath, for drying the foil after the second rinsing, and eventually also means for burning in the lacquer layer applied to the oxide layer.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a cross-sectional view of an aluminum band provided with the insulating and decorative layer thereon, and drawn to a greatly enlarged scale;

FIG. 2 is a schematic view of an apparatus according to the present invention; and FIG. 2a is a partial view of a slight modification of the apparatus shown in FIG. 2.

DESCRIPTION OF THE PREFERRED EMBODIMENTS

FIG. 1 illustrates a cross-section through an aluminum band 10 provided with an insulating or decorative coating 12 according to the present invention, and for clarity's sake, the thickness of this coating is exaggerated in FIG. 1. The coating 12 consists of an inner oxide layer produced by an electrolytic anodizing process onto the outer surface of the band 10 and of an outer lacquer layer 16 applied by electrophoresis to the inner oxide layer. The oxide layer 14 is porous and is intimately bound to the base material 10 which essentially consists of aluminum or aluminum alloy. During application of the outer lacquer layer by electrophoresis onto the oxide layer 14, the lacquer particles are also deposited in the pores of the oxide layer 14 so that an intimate bond between the oxide layer 14 and the lacquer layer 16 will result. Due to the application of the lacquer layer by electrophoresis onto the inner oxide layer 14, the lacquer layer 16 will be formed heavier on those portions of the oxide layer at which the latter due to its porosity or for other reasons has a smaller insulating capacity, since due to the greater potential difference at this location more lacquer particles are deposited thereon. The production of the lacquer layer by electrophoresis constitutes therefore at the same time a test for the quality of the oxide layer 14, whereby eventually existing faults in the oxide layer are automatically corrected by increased accumulation of lacquer particles.

One embodiment of an apparatus according to the present invention, for producing a band such as that shown in FIG. 1, is schematically illustrated in FIG. 2. This apparatus includes a supply roll 20 on which an aluminum foil or band 22 consisting essentially of aluminum or an aluminum alloy is wound up and the aluminum band or foil 22 is guided over a guide roller 24 into an electrolytic anodizing device 26 which, in the embodiment illustrated, comprises two chambers 28 and 30 separated from each other by a central wall 34. The aluminum band 22 enters first into the chamber 28 and is guided through the electrolyte therein by a guide roller 32 adjacent to the bottom wall of the chamber 28 and leaves the latter over a guide roller 36 turnably mounted at the upper end of the central wall 34 to enter into the second chamber 30 and is passed through the electrolyte therein by a guide roller 38 adjacent to the bottom wall of the second chamber, from which the aluminum band 22 is guided over a roller 40 at the end of the second chamber. A stationary electrode 42, respectively 44, is arranged in each of the chambers 28 and 30 in such a manner that the lower end of each electrode dips into the electrolyte respectively contained in these chambers and is out of direct contact with the aluminum band guided therethrough. The outer ends of the electrode 42 and 44 are connected to a supply of alternating current 46 as schematically illustrated in FIG. 2. The portions of the band 22 respectively located in the electrolyte of chambers 28 and 30 form thereby a bipolar conductor.

The anodizing means 26 may also comprise more than two chambers. Likewise, instead of guiding the aluminum band 22 in a meandering manner, as shown in FIG. 2, through the electrolyte in the two chambers 28 and 30, it is also possible to guide the band along a straight path through the electrolyte in the two chambers, whereby the outer walls and the central wall 34 of the anodizing means 26 are formed with corresponding slots provided with sealing means for guiding the band 22 along a straight path and in a sealed manner through the electrolytes contained in the two chambers. The illustrated anodizing means 26, the band will be provided with an oxide layer multi-chamber alternating current anodizing apparatus in which the band passing therethrough forms a bipolar conductor.

During passage of the band 22 through the anodizing means 26, the band will be provided with an oxide layer thereon due to the known electrochemical processes occurring during the passage of the band through the anodizing means, which electrochemical processes are known and need therefore not be discussed in detail.

After leaving the anodizing means 26, the band 22 is passed through a rinsing device 48, of known construction and only schematically illustrated in FIG. 2, in which the oxide layer provided on the band 22 is thoroughly rinsed. Evidently, it is also possible to provide between the supply roll 20 and the anodizing device 26 means for cleaning the aluminum band 22 before the latter enters the anodizing device, if such should be necessary.

The aluminum band 22 provided with the oxide layer on the outer surface thereof is passed after the rinsing device 48 into an electrophoresis device 50 which comprises a container 52 in which a bath 53 is maintained. The band 22 is guided about a guide roller 58 turnably mounted in the region of the upper end of one end wall of the container 52 and through the bath 53 by means of two guide rollers 56 adjacent opposite end walls of the container and to the bottom wall thereof to leave the bath over a guide roller 58 turnably mounted in the region of the other end wall of the container. An electrode 60 is arranged in the bath 53 in the container 52 out of direct contact with the band 22 which is guided through the bath and the electrode 60 is connected to the minus pole of a direct current supply, not shown in the drawing. The band 22 itself is connected to the plus pole of this direct current supply. Since the oxide layer applied in the anodizing device 26 to the aluminum band is an insulating layer, it is necessary to make the connection of the plus pole of the direct current supply to the band 22 before the oxide layer is applied thereto. For this purpose, the positive pole of the direct current supply may be connected directly to the supply roll 20 as schematically indicated in FIG. 2a, or preferably by a contact roll 54 engaging the band 22 between the supply roll 20 and the guide roller 24 on the anodizing device 26, and the contact roller 54 is then connected to the positive pole of the direct current supply as schematically shown in FIG. 2.

The bath 53 maintained in the container 52 essentially consists of water in which 10 to 12% by volume of lacquer or color particles are dispersed which due to their contact with the negatively charged electrode 60 are likewise negatively charged to be attracted by the positively charged band 22 so that the particles will not only form a thin outer layer on the oxide layer, but will also penetrate the pores of the oxide layer. The electrochemical processes occurring during this electrophoresis are well known and a further description thereof seems therefore not necessary.

After leaving the guide roller 58, the aluminum band 22 with the coating 12 comprising the inner oxide layer and the lacquer layer applied thereto is then passed through an additional rinsing means 62 of known construction, through drying means 64 schematically illustrated in FIG. 2, and through a burning-in device 66, of known construction and only schematically shown in FIG. 2, to be finally wound up by the windup or take-up device 68 which is driven continuously by means not shown in the drawing.

The electrolyte in the chambers 28 and 30 of the electrolytic anodizing means 26 consists essentially of an aqueous sulfuric acid of a concentration of 20% by volume and this electrolyte is preferably maintained at a temperature of 40° C.

The anodic treatment of the aluminum band is carried out preferably at a current density of about 50 amperes per 100 square centimeters. The bath maintained in the electrophoresis device 50 essentially consists of water with 10 to 12% per volume lacquer or color particles dispersed therein and the electrophoresis is preferably carried out with a current density of 0.3 ampere per 100 square centimeters. The windup means 68 is preferably driven with such speed that the anodic treatment of the band in the anodizing means 26 as well as the electrophoresis in the device 50 is carried out for a time of about 12 seconds.

According to the present invention the aluminum band 22 is therefore provided with a two-layer coating in a continuous automatic process in which in the device 26 a porous oxide layer is applied to the outer surface of the aluminum band and in the device 50 a lacquer layer is applied to the oxide layer whereby due to the electrophoresis the lacquer particles will also be disposed in the pores of the porous oxide layer.

It will be understood that each of the elements described above, or two or more together, may also find a useful application in other types of apparatus differing from the types described above.

While the invention has been illustrated and described as embodied in an apparatus for producing an aluminum foil or band with an electric insulating or decorative coating, it is not intended to be limited to the details shown, since various modifications and structural changes may be made without departing in any way from the spirit of the present invention.

Obviously, it is also possible to subject the aluminum band to further treatment and it is also possible to use instead of the burning-in means 66 a different device in order to fix the lacquer layer to the oxide layer.

What is claimed as new and desired to be protected by Letters Patent is set forth in the appended claims:

1. Apparatus for making a coated elongated aluminum body, comprising in combination, electrolytic anodizing means comprising at least two adjacent chambers each adapted to contain an electrolyte, a stationary first electrode in each of said chambers in conductive relationship with said elongated body, a source of alternating current, connecting means for connecting said electrodes to said source of alternating current, and guide means for guiding said elongated body successively through said adjacent chambers; an electrophoresis device downstream of said electrolytic anodizing means and including container means adapted to contain a bath, a second electrode in conductive relationship with said elongated body, a direct current supply, conductive means for connecting said second electrode to the negative pole of said direct current supply, contact means for connecting said elongated body upstream of said electrolytic anodizing means to the positive pole of said direct current supply, and additional guide means for guiding said elongated body through a bath in said container means; and rinsing means between said electrolytic anoziding means and said electrophoresis device for rinsing said elongated body.

2. Apparatus as defined in claim 1; further comprising supply means upstream of said anodizing means and said electrophoresis device for supplying said elongated body thereto; and wherein the electrolyte adapted to be contained in said chambers consists essentially of aqueous sulfuric acid and the bath adapted to be contained in said container means consists essentially of water and 10 to 15% by volume of lacquer or color particles dispersed therein.

3. Apparatus as defined in claim 1, wherein said contact means comprises a contact roller connected to the positive pole of said direct current supply and engaging said elongated body upstream of said anodizing means.

4. Apparatus as defined in claim 2; said supply means being in the form of a roll onto which said elongated body is wound, said positive pole of said direct current supply being connected to said roll.

5. Apparatus as defined in claim 1; and including additional rinsing means downstream of said electrophoresis device, and drying means and burning-in means downstream of said additional rinsing means.

6. Apparatus as defined in claim 5; and including takeup means downstream of said burning-in means for continuously taking up said elongated body with the coating thereon with a predetermnied substantially constant speed.

References Cited
UNITED STATES PATENTS

| | | | |
|---|---|---|---|
| 2,214,876 | 9/1940 | Clark | 204—181 X |
| 2,707,703 | 5/1955 | Dorst | 204—181 X |
| 2,800,447 | 7/1957 | Graham, Jr. | 204—181 |
| 2,901,412 | 8/1959 | Mostovych et al. | 204—58 X |
| 2,928,776 | 3/1960 | Puppolo | 204—35 A X |
| 3,533,920 | 10/1970 | Covino | 204—58 X |
| 3,567,597 | 3/1971 | Hovey et al. | 204—58 X |

JOHN H. MACK, Primary Examiner

A. C. PRESCOTT, Assistant Examiner

U.S. Cl. X.R.

204—28, 58, 181